(12) United States Patent
Willett et al.

(10) Patent No.: US 10,344,710 B2
(45) Date of Patent: Jul. 9, 2019

(54) ENGINE WITH A THRUST REVERSER LOCKOUT MECHANISM

(71) Applicant: GE Aviation Systems LLC, Grand Rapids, MI (US)

(72) Inventors: Kenneth R. Willett, West Chester, OH (US); Brent Michael Ozanich, Selah, WA (US); George Arnold Conway, Moorpark, CA (US); Jonathan L. Spiry, Yakima, WA (US); Daniel Peter Beck, Yakima, WA (US); Jeffrey Michael Larkin, Yakima, WA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 343 days.

(21) Appl. No.: 14/888,811

(22) PCT Filed: Jun. 7, 2013

(86) PCT No.: PCT/US2013/044730
§ 371 (c)(1),
(2) Date: Nov. 3, 2015

(87) PCT Pub. No.: WO2014/196985
PCT Pub. Date: Dec. 11, 2014

(65) Prior Publication Data
US 2016/0076486 A1  Mar. 17, 2016

(51) Int. Cl.
*F02K 1/76* (2006.01)
*F02K 1/72* (2006.01)

(52) U.S. Cl.
CPC ............... *F02K 1/766* (2013.01); *F02K 1/72* (2013.01); *F05D 2260/02* (2013.01)

(58) Field of Classification Search
CPC ......... F02K 1/766; F02K 1/72; F05D 2260/02
See application file for complete search history.

(56) References Cited

U.S. PATENT DOCUMENTS 2,688,232 A * 9/1954 Geyer ..................... F15B 11/22
                                                        74/110
3,180,234 A * 4/1965 Crawley ................. B64C 25/22
                                                        92/110
(Continued)

FOREIGN PATENT DOCUMENTS

EP          0090540 A2     10/1983
EP          0801221 A2     10/1997
(Continued)

OTHER PUBLICATIONS

European Search Report and Opinion issued in connection with corresponding EP Application No. 13886258.6 dated Jan. 17, 2017.
(Continued)

Primary Examiner — Ted Kim
(74) Attorney, Agent, or Firm — McGarry Bair PC

(57) ABSTRACT

A turbofan engine having a thrust reverser having at least one movable control surface, movable to and from a reversing position where at least a portion of the bypass air flow is at least partially reversed, a thrust reverser actuation system having multiple actuators and a lockout mechanism movable between an inhibit condition, wherein movement of the multiple actuators is prevented, and a permit condition, wherein movement of the multiple actuators is permitted.

13 Claims, 8 Drawing Sheets

(56) References Cited

U.S. PATENT DOCUMENTS

| | | | |
|---|---|---|---|
| 4,463,661 A | | 8/1984 | Tootle |
| 4,491,059 A | * | 1/1985 | Martin ............... F02K 1/76 92/14 |
| 4,714,006 A | * | 12/1987 | Tootle ............... B64C 13/00 74/105 |
| 4,754,694 A | * | 7/1988 | Martin ............... F02K 1/76 92/14 |
| 5,280,704 A | | 1/1994 | Anderson et al. |
| 5,609,020 A | | 3/1997 | Jackson et al. |
| 5,819,527 A | | 10/1998 | Fournier |
| 5,960,626 A | | 10/1999 | Baudu et al. |
| 6,045,091 A | | 4/2000 | Baudu et al. |
| 6,220,546 B1 | * | 4/2001 | Klamka ............... B64D 29/00 244/129.4 |
| 6,286,784 B1 | * | 9/2001 | Hardy ............... F02K 1/76 239/265.19 |
| 6,487,846 B1 | | 12/2002 | Chakkera et al. |
| 6,625,972 B1 | * | 9/2003 | Sternberger ............... F02K 1/76 239/265.29 |
| 6,786,039 B2 | * | 9/2004 | Chakkera ............... F02K 1/766 239/265.29 |
| 2003/0042358 A1 | * | 3/2003 | Sternberger ............... F02K 1/72 244/110 B |
| 2003/0066284 A1 | | 4/2003 | Chakkera et al. |
| 2003/0070416 A1 | | 4/2003 | Johnson et al. |
| 2004/0139724 A1 | | 7/2004 | Colotte et al. |
| 2005/0001095 A1 | * | 1/2005 | Christensen ............... F02K 1/766 244/110 B |
| 2007/0057119 A1 | * | 3/2007 | McAuley ............... F02K 1/763 244/110 B |
| 2008/0105074 A1 | * | 5/2008 | Bristol ............... F02K 1/766 74/460 |
| 2008/0134664 A1 | | 6/2008 | Brannon et al. |
| 2010/0192715 A1 | | 8/2010 | Vauchel et al. |
| 2012/0137654 A1 | | 6/2012 | Burgess |
| 2012/0151897 A1 | | 6/2012 | Kopecek et al. |
| 2013/0264399 A1 | * | 10/2013 | Wingett ............... F02K 1/625 239/265.19 |

FOREIGN PATENT DOCUMENTS

| | | |
|---|---|---|
| JP | 10153143 A | 6/1998 |
| JP | 1179098 A | 3/1999 |
| JP | 2004278514 A | 10/2004 |
| JP | 2005537434 A | 12/2005 |

OTHER PUBLICATIONS

PCT Search Report and Written Opinion issued in connection with corresponding Application No. PCT/US2013/044730 dated Mar. 13, 2014.

Unofficial English Translation of Japanese Office Action issued in connection with corresponding JP Application No. 2016518309 dated Nov. 8, 2016.

* cited by examiner

ENGINE WITH A THRUST REVERSER LOCKOUT MECHANISM

BACKGROUND OF THE INVENTION

Contemporary aircraft engines may include a thrust reverser actuation system to assist in reducing the aircraft speed during landing. Typical thrust reversers include a movable element that when in the active position reverses at least a portion of the air flow passing through the engine. During maintenance of such areas of the engine the movement of the movable part is inhibited for safety; currently, this is done manually by a user near the equipment that controls the hydraulic flow to the movable element.

BRIEF DESCRIPTION OF THE INVENTION

In one embodiment, the invention relates to a turbofan engine having a turbine engine, a nacelle surrounding the turbine engine and defining an annular bypass duct between the nacelle and the turbine engine and extending through the turbofan engine to define a generally forward-to-aft bypass air flow path, a thrust reverser having at least one movable control surface, movable to and from a reversing position where at least a portion of the bypass air flow is at least partially reversed, a thrust reverser actuation system having multiple actuators with each actuator having an extendable/retractable portion operably coupled to the at least one movable control surface to move the at least one movable control surface into and out of the reversing position and a synchronization mechanism to synchronize the multiple actuators, and a lockout mechanism movable between an inhibit condition, wherein movement of the multiple actuators is prevented, and a permit condition, wherein movement of the multiple actuators is permitted.

DESCRIPTION OF EMBODIMENTS OF THE INVENTION

Figure 1:
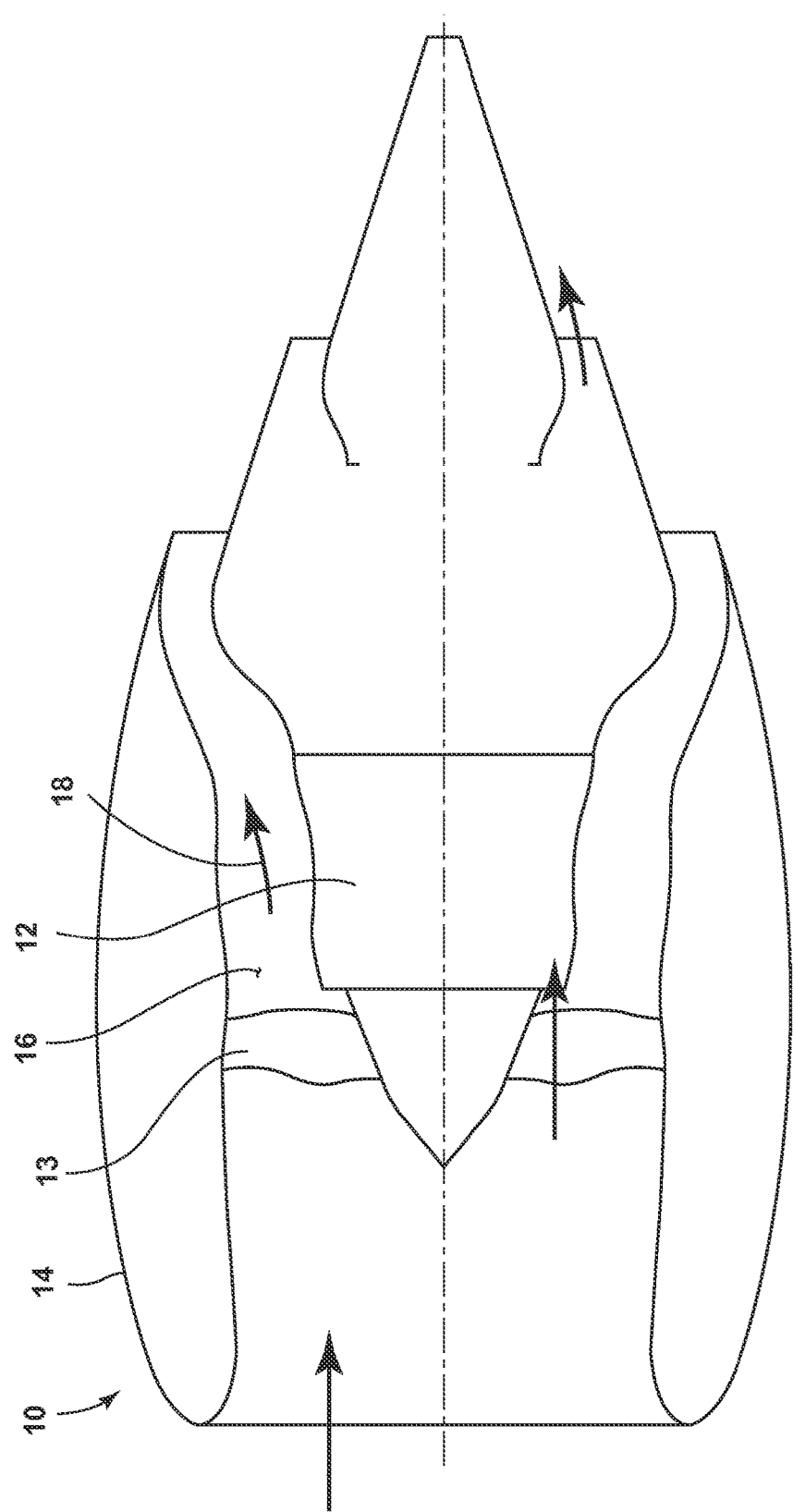
FIG. 1 is a schematic view of a turbofan jet engine with a portion of the outer nacelle cut away for clarity.

FIG. 1 illustrates a turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular air flow path or annular bypass duct 16 through the jet engine assembly 10 to define a generally forward-to-aft bypass air flow path as schematically illustrated by the arrow 18.

Figure 2:
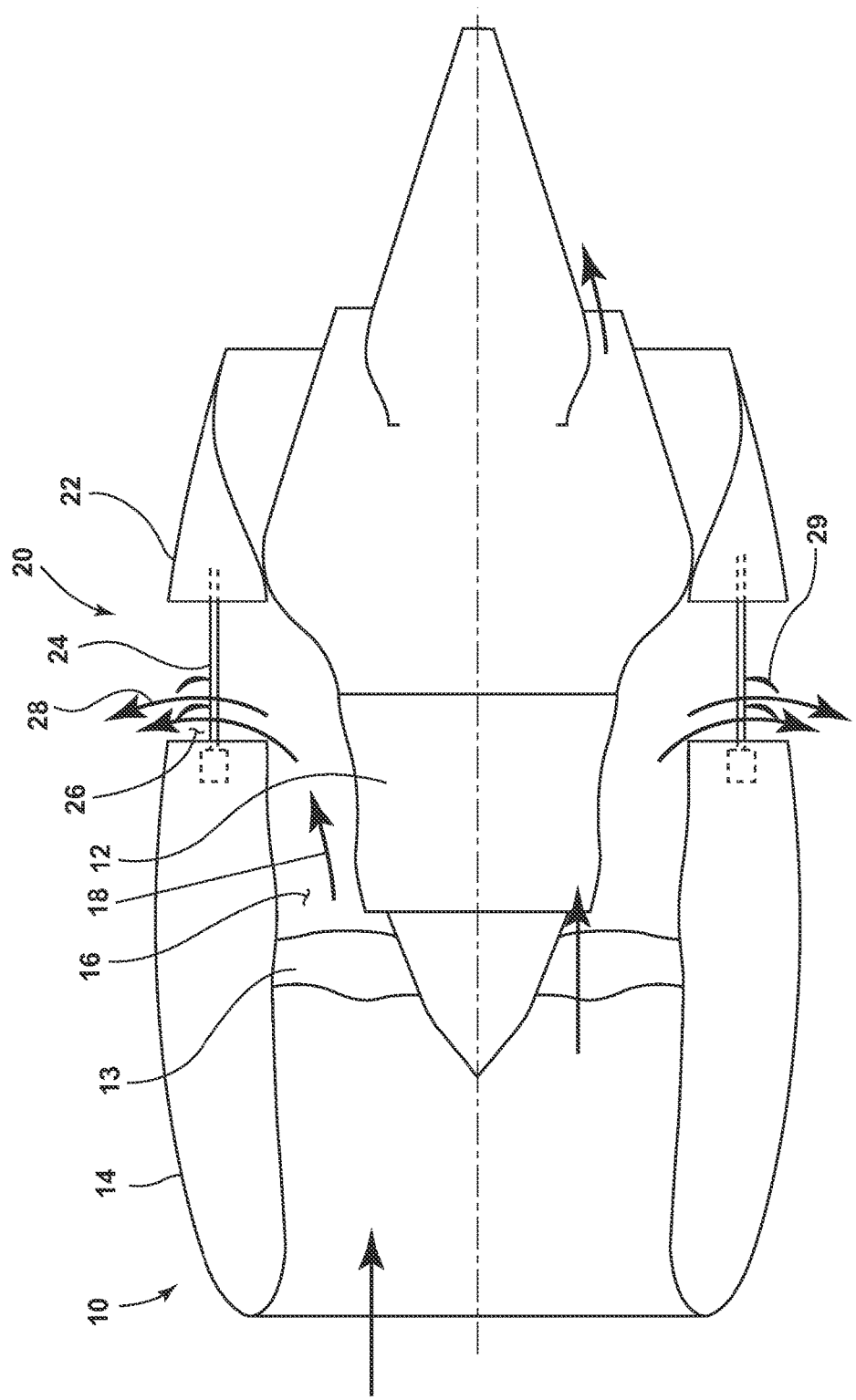
FIG. 2 is a schematic view of the engine of FIG. 1 with an exemplary thrust reverser.

A thrust reverser with at least one movable element, which is movable to and from a reversing position, may be used to change the direction of the bypass airflow. In the reversing position the movable element may be configured to reverse at least a portion of the bypass air flow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes at least one moveable control surface or movable element 22. The movable element 22 has been illustrated as a slidable portion of an outer cowling that is capable of axial motion with respect to the forward portion of the nacelle 14. A hydraulic actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap may be included to aid in directing the air flow path between the movable element 22 and the forward portion of the nacelle 14.

Figure 3:
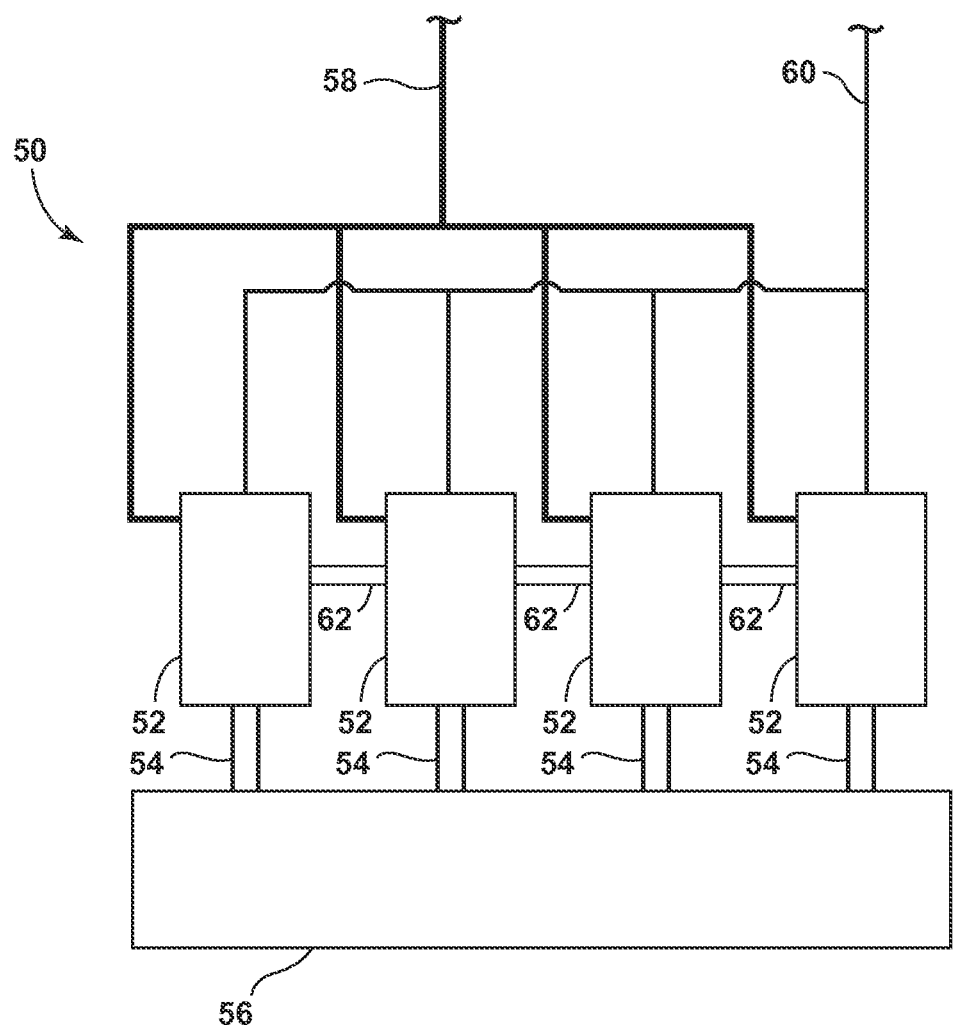
FIG. 3 is a schematic view of a thrust reverser actuation system that may be utilized in the turbofan jet engine of FIG. 1.

The thrust reverser 20 changes the direction of the thrust force by reversing at least a portion of the bypass air flow. It will be understood that any number of multiple actuators may be utilized to move the moveable element into the reversing position. FIG. 3 schematically illustrates a thrust reverser actuation system 50 that may be used in the turbofan jet engine assembly 10 and that includes multiple actuators 52 with each actuator 52 having an extendable/retractable portion 54 that may be operably coupled to the moveable element 56 to move the movable element into and out of the reversing position. The multiple actuators 52 may be fluidly connected with a hydraulic supply line 58 and return line 60. A synchronization mechanism 62 may be included to synchronize the multiple actuators 52. It will be understood that any number of multiple actuators 52 may be included in the thrust reverser actuation system 50 and that while four actuators 52 have been illustrated, that the thrust reverser actuation system 50 may include as few as two actuators 52.

Figure 4:
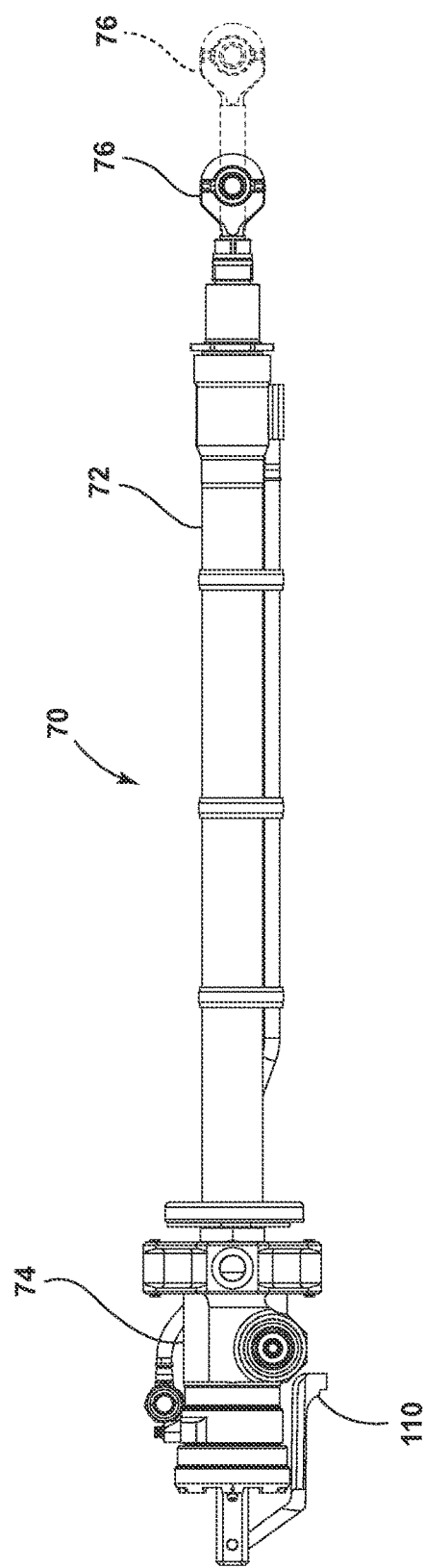
FIG. 4 is a side view of an actuator that may be utilized in the system of FIG. 3.
Figure 5:
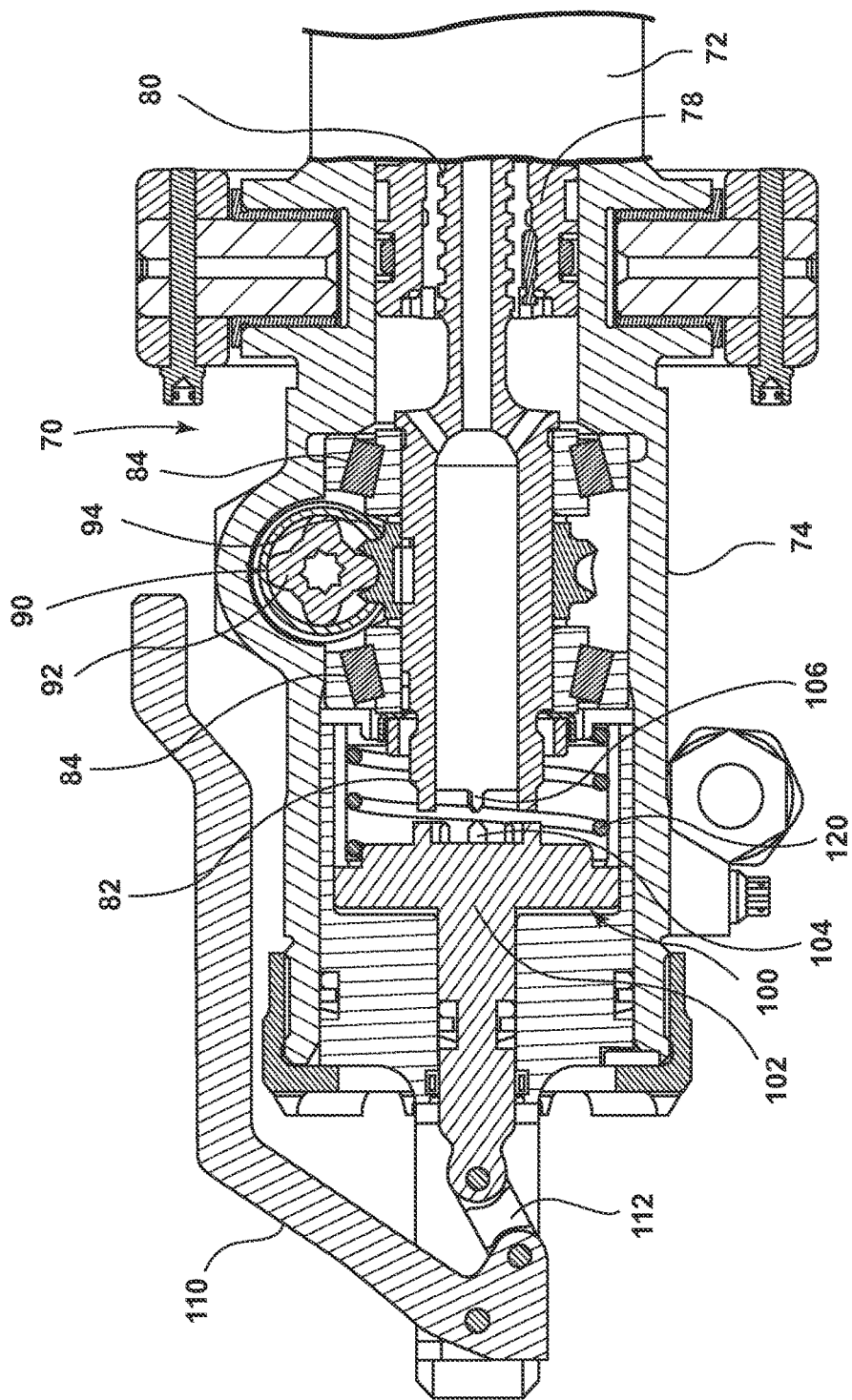
FIG. 5 is a cross-sectional view of a portion of the actuator of FIG. 4 with the lockout mechanism in a permit condition.

FIG. 4 illustrates an actuator 70 with a cylinder 72 having an actuator housing 74, which may be used in the thrust reverser actuation system 50. An end assembly 76 may be provided to facilitate connection to the movable element and is shown in a retracted position and a partially extended position (in phantom). FIG. 5 illustrates a cross section of a portion of the actuator 70. A piston 78 may be axially movable within the cylinder 72 and may be coupled with a lead screw 80. The lead screw 80 and piston 78 may be thought of as forming the extendable/retractable portion of the actuator 70. One end 82 of the lead screw 80 may be held in suitable bearings 84 within the actuator housing 74. As the piston 78 moves back and forth in the cylinder 72, the lead screw 80 rotates at a speed proportional to the velocity of the piston 78. As the piston 78 extends the end assembly 76 also extends and the moveable element of the thrust reverser is moved. Piston 78 is anti-rotated by attachment of the end assembly 76 to the moveable element.

A synchronization mechanism 90 may be operably coupled to the lead screw 80. More specifically, a worm gear shaft 92 may be coupled with the lead screw 80 through a worm wheel 94 and may form the synchronization mechanism 90 between multiple actuators 70. Each actuator 70 in the thrust reverser actuation system 50 may include similar components and the worm gear shafts 92 of each actuator 70 may be coupled with each other. Because the speed of the worm gear shaft 92 is also proportional to the velocity of the piston 78, when the worm gear shafts 92 of two or more such actuators 70 are connected together, they will be mechanically synchronized.

Figure 7:
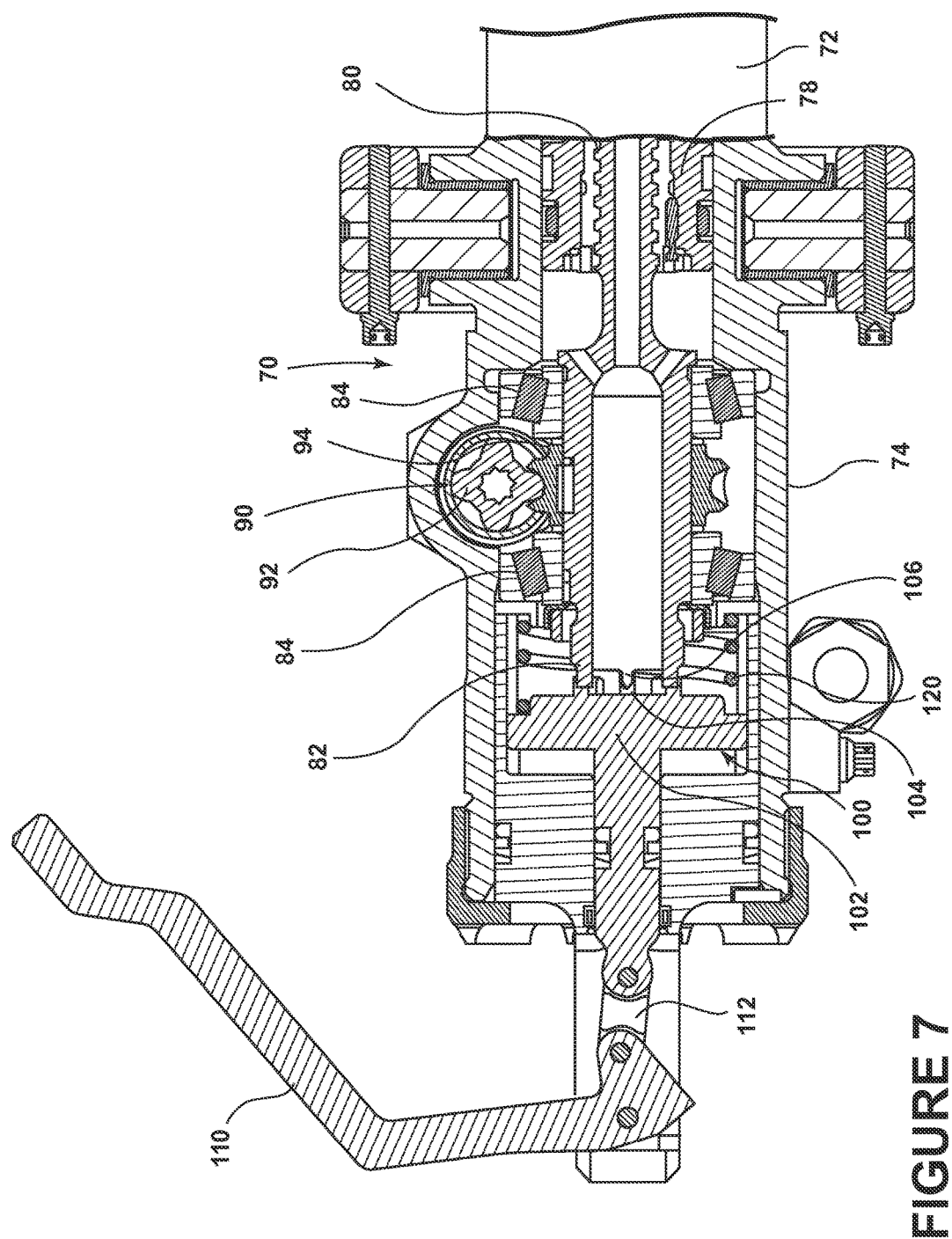
FIG. 7 is a cross-sectional view of a portion of the actuator of FIG. 4 with the lockout mechanism in an inhibit condition.

The actuator 70 may be locked into position by a lockout mechanism 100. The lockout mechanism 100 may selectively couple with the lead screw 80 and may be movable between an inhibit condition (FIG. 7) wherein movement of the multiple actuators 70 is prevented, and a permit condition (FIG. 5), wherein movement of the multiple actuators 70 is permitted. A piston 102 forming a portion of the lockout mechanism 100 may be axially movable within the actuator housing 74 toward and away from the end 82 of the lead screw 80. The piston 102 may be moveable between a first position, corresponding to the permit condition of the hydraulic actuator 70 (FIG. 5), and a second position where the piston 102 selectively couples with the end 82 of the lead screw 80, corresponding to the inhibit condition of the hydraulic actuator 70 and the synchronization mechanism 90 (FIG. 7). The piston 102 may be selectively coupled with the lead screw 80 in any suitable manner. In the illustrated example, the piston 102 includes teeth 104 that engage portions of the lead screw 80, such as corresponding teeth 106 on the lead screw 80.

Figure 6:
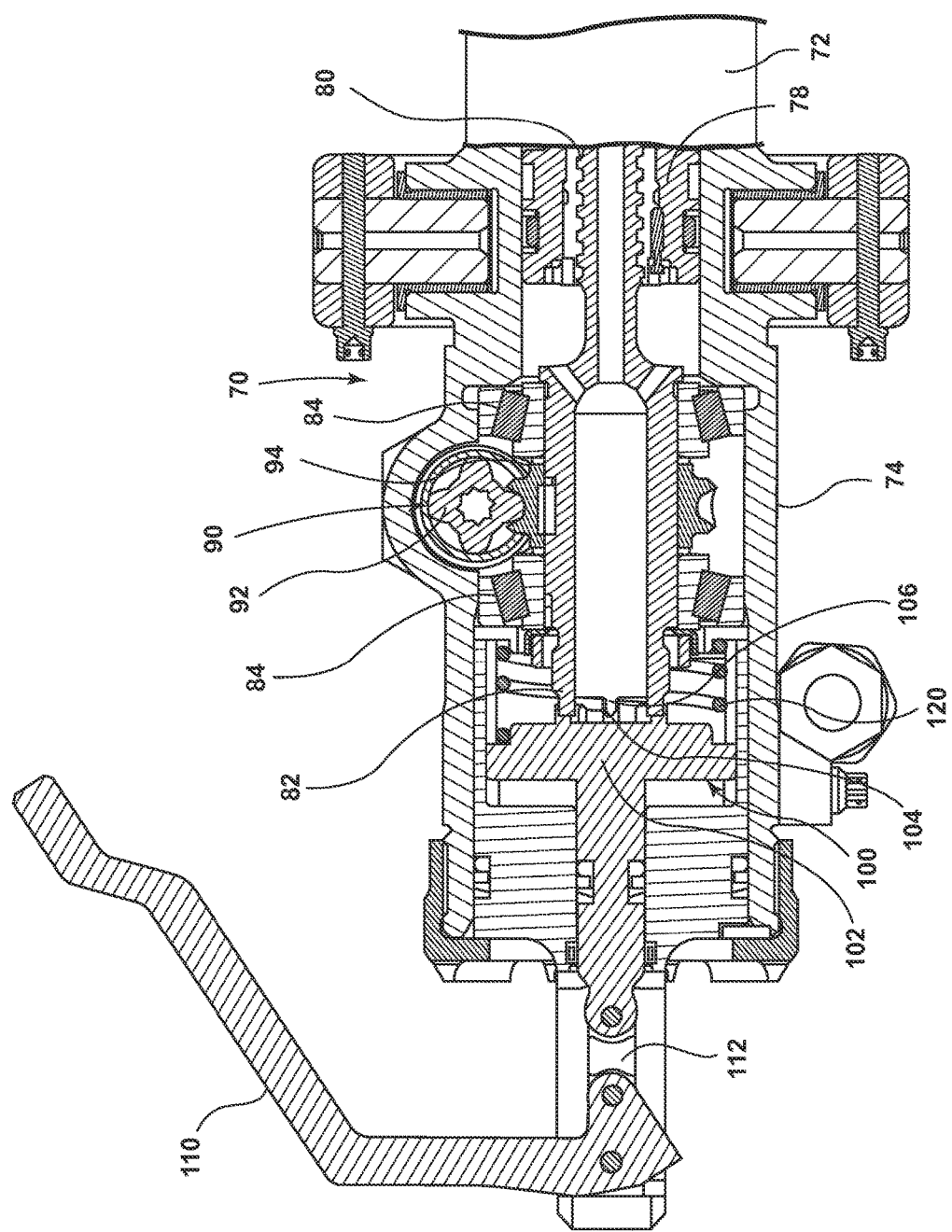
FIG. 6 is a cross-sectional view of a portion of the actuator of FIG. 4 with a lockout mechanism in an intermediate position.

A handle 110 is operably coupled with the piston 102 and may move the piston 102 between the first position and the second position. The handle 110 may be formed in any suitable manner and may be operably coupled with the piston 102 in any suitable manner. In the illustrated example, the handle 110 is operably coupled to the piston 102 through a rotatable link 112. The handle 110 is moveable between a first position (FIG. 5) where the lockout mechanism 100 is in the permit condition and a second position (FIG. 7) where the lockout mechanism 100 is in the inhibit condition. When the handle 110 is in the first position it may be pulled by a user to an intermediate position illustrated in FIG. 6. The handle 110 may be continued to be pulled until the rotatable link 112 is rotated to an over-center position when the handle 110 is moved to the second position as illustrated in FIG. 7.

A biasing element 120 may resist the movement of the handle 110 to the second position and may bias the piston 102 away from the lead screw 80. The biasing element may include any suitable biasing element including a spring. Once the handle 110 is moved to the second position the biasing element 120 may bias the link 112 to the over-center position. In this manner the biasing element 120 forms a lock element.

When it is desired to inhibit the movement of the moveable element of the thrust reverser a user may operate the handle 110 to place the lockout mechanism 100 into the inhibit condition. When the lockout mechanism 100 is in the inhibit condition, the piston 102 operably couples with the lead screw 80 and prevents rotation of the lead screw 80. More specifically, the teeth 104 of the piston 102 engage with the teeth 106 of the lead screw 80 and prevent the lead screw 80 from rotating. As the lead screw 80 is prevented from rotating the worm gear shaft 92 and the other actuators 70 are also inhibited from moving.

In this manner, when the lockout mechanism is in the inhibit condition movement of the multiple actuators 70 is prevented through the synchronization mechanism 90. Because the worm gear shaft 92 is coupled with the lead screw 80 and because the worm gear shafts 92 of two or more such actuators 70 are connected together the lockout mechanism 100 may prevent motion of the other actuators 70. In this manner the lockout mechanism 100 locks out each of the multiple actuators operably coupled to the synchronization mechanism.

To disengage the lockout mechanism 100 a user may simply push on the handle 110 to overcome the force created by the biasing element 120. The biasing element 120 may continue to push the piston 102 away from the lead screw 80 so that the teeth 104 and 106 may disengage and the lock mechanism may be released. Once the lockout mechanism 100 is put into a permit condition, the actuators 70 may be permitted to move.

Figure 8:
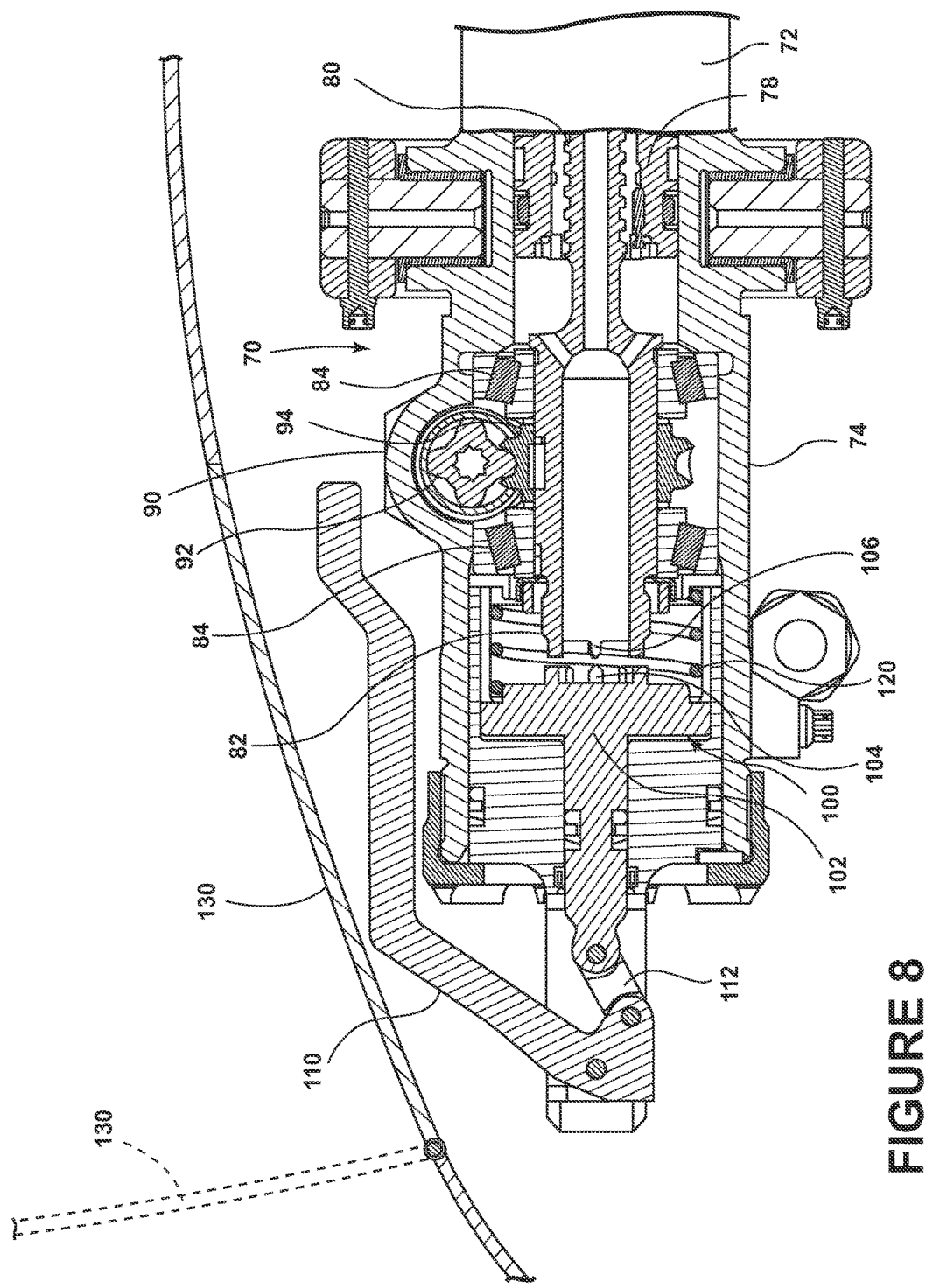
FIG. 8 is a cross-sectional view of a portion of the actuator of FIG. 4 and schematically illustrating positions of an engine service door.

FIG. 8 illustrates a door 130 that may be located adjacent the handle 110 and may be moveable between a closed position (as shown) and an opened position (in phantom). In the opened position the door 130 may provide access to the handle 110. If the handle 110 is left in the second position, corresponding to the inhibit condition of the lockout mechanism 100, when the door 130 is moved to the closed position, the door 130 may contact the handle 110 with enough force to overcome the biasing element 120 and move the handle 110 back to the first position. This returns the lockout mechanism 100 to the permit condition and allows the lead screw 80 to rotate and the actuator 70 to operate. In this manner, upon closure of the door 130 the lockout mechanism 100 may be automatically unlocked.

The embodiments described above provide for a variety of benefits including that movement of the movable element of the thrust reverser may be inhibited for crew safety. The above described embodiments provide enhanced safety during maintenance with minimum impact on installation and weight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbofan engine, comprising:
a turbine engine;
a nacelle surrounding the turbine engine and defining an annular bypass duct between the nacelle and the turbine engine and extending through the turbofan engine to define a generally forward-to-aft bypass air flow path;
a thrust reverser having at least one movable control surface, movable to and from a reversing position where at least a portion of the bypass air flow is at least partially reversed;
a thrust reverser actuation system having multiple actuators and a synchronization mechanism to synchronize the multiple actuators, with at least one of the multiple actuators, comprising,
a housing;
a rotatable lead screw having one end defining a first axial end surface of the rotatable lead screw located within the housing; and a piston operably coupled to the rotatable lead screw and driven thereby between an extended position and a retracted position and where the piston is operably coupled to the at least one movable control surface to move the at least one movable control surface into and out of the reversing position; and a lockout mechanism having a lockout piston, axially adjacent to the rotatable lead screw, having a second axial end surface selectively coupled to the first axial end surface of one end of the rotatable lead screw within the housing and axially movable between an inhibit condition, wherein rotation of the rotatable lead screw is prevented by engagement of the first and second axial end surfaces and movement of the multiple actuators is prevented, and a permit condition, wherein rotation of the rotatable lead screw is permitted by disengagement of the first and second axial end surfaces and movement of the multiple actuators is permitted, the lockout mechanism also including a handle operably coupled to axially move the lockout piston through a rotatable link and configured to move between a first position where the lockout mechanism is in the permit condition and a second position where the lockout mechanism is in the inhibit condition.

2. The turbofan engine of claim 1 wherein the lockout mechanism further comprises a biasing element to resist movement of the handle to the second position.

3. The turbofan engine of claim 1 wherein the synchronization mechanism includes a worm gear shaft operably coupled to the lead screw via a worm wheel.

4. The turbofan engine of claim 1, further comprising a door located adjacent the handle and moveable between a closed position and an opened position wherein access to the handle is provided.

5. The turbofan engine of claim 4 wherein when the door is moved to the closed position it contacts the handle to move the lockout mechanism to the permit condition.

6. The turbofan engine of claim 1 wherein the lockout mechanism locks out each of the multiple actuators operably coupled to the synchronization mechanism.

7. The turbofan engine of claim 1 wherein the rotatable link is rotatable to an over-center position when the handle is moved to the second position.

8. The turbofan engine of claim 7 wherein the lockout mechanism further comprises a biasing element to bias the lockout piston to the over-center position.

9. The turbofan engine of claim 1, further comprising a door located adjacent the handle and moveable between a closed position and an opened position wherein access to the handle is provided and wherein when the door is moved to the closed position it contacts the handle to move the handle to the first position and the lockout mechanism to the permit condition.

10. A turbofan engine comprising:
a turbine engine;
a nacelle surrounding the turbine engine and defining an annular bypass duct between the nacelle and the turbine engine and extending through the turbofan engine to define a generally forward-to-aft bypass air flow path;
a thrust reverser having at least one movable control surface, movable to and from a reversing position where at least a portion of the bypass air flow is at least partially reversed;
a thrust reverser actuation system having multiple actuators with each actuator having an extendable and retractable portion operably coupled to the at least one movable control surface to move the at least one movable control surface into and out of the reversing position and a synchronization mechanism to synchronize the multiple actuators;
a lockout mechanism selectively coupled to the extendable and retractable portion of one of the multiple actuators and movable between an inhibit condition, wherein movement of the multiple actuators is prevented, and a permit condition, wherein movement of the multiple actuators is permitted, the lockout mechanism comprising:
an axially moveable lockout piston having a first axial end surface;
a rotatable lead screw, axially adjacent to the lockout piston, with having one end defining a second axial end surface of the rotatable lead screw, the rotatable lead screw being selectively coupled to and decoupled from the lockout piston by engagement and disengagement of the first and second axial end surfaces caused by axial movement of the lockout piston; and
a handle for moving the lockout piston of the lockout mechanism axially between the inhibit condition and the permit condition by for moving the lockout piston into engagement with the second axial end surface of one end of the rotatable lead screw when the lockout mechanism is in the inhibit condition; and
a door located adjacent the handle and moveable between a closed position and an opened position, wherein upon moving the door to the closed position, the door contacts the handle to axially move the lockout piston of the lockout mechanism to the permit condition and axially move the lockout piston out of engagement with the second axial end surface of one end of the rotatable lead screw.

11. The turbofan engine of claim 10 wherein the handle is operably coupled to the lockout piston through a rotatable link that is rotatable to an over-center position when the handle is moved to the second position.

12. The turbofan engine of claim 11 wherein the lockout mechanism further comprises a biasing element to bias the lockout piston to the over-center position.

13. The turbofan engine of claim 10 wherein the handle is moveable between a first position where the lockout mechanism is in the permit condition and a second position where the lockout mechanism is in the inhibit condition.

* * * * *